United States Patent

Ilk

[15] 3,644,793

[45] Feb. 22, 1972

[54] TIMED "ON" CYCLE ELECTRONIC TIMING SYSTEM

[72] Inventor: Ronald J. Ilk, Milwaukee, Wis.

[73] Assignee: Cutler-Hammer, Inc., Milwaukee, Wis.

[22] Filed: May 1, 1970

[21] Appl. No.: 33,714

[52] U.S. Cl. ....................317/141 S, 317/142 R, 307/141.4, 307/293

[51] Int. Cl. ....................H01h 47/18

[58] Field of Search ....................317/148.5 TD, 141, 142; 307/141, 141.4, 293

[56] References Cited

UNITED STATES PATENTS

| | | | |
|---|---|---|---|
| 3,512,048 | 5/1970 | Wallentowity et al. | 317/142 S |
| 3,461,322 | 8/1969 | Hirsch et al | 307/293 |
| 3,397,323 | 8/1968 | Hirsch | 307/141 |

OTHER PUBLICATIONS

G. E. Application Note 90.70, 11/67. W. R. Spofford, Jr. The D13T– A Programmable Unijunction Transistor.

*Primary Examiner*—J. D. Miller
*Assistant Examiner*—Harry E. Moose, Jr.
*Attorney*—Hugh R. Rather

[57] ABSTRACT

An AC interval timer for controlling any AC load such as the lamp of an infrared heating device, motor, solenoid valve or the like. The timing system is supplied through a rectifier from the same AC source that supplies the load and provides a timed "on" cycle after momentary operation of an activating switch. Features include a pulse input that causes latching of the load "on" and prevents false triggering, a timing circuit that incorporates temperature compensation and good power supply stability characteristics, and a reset clamp to insure accurate repeatability and recycling.

8 Claims, 1 Drawing Figure

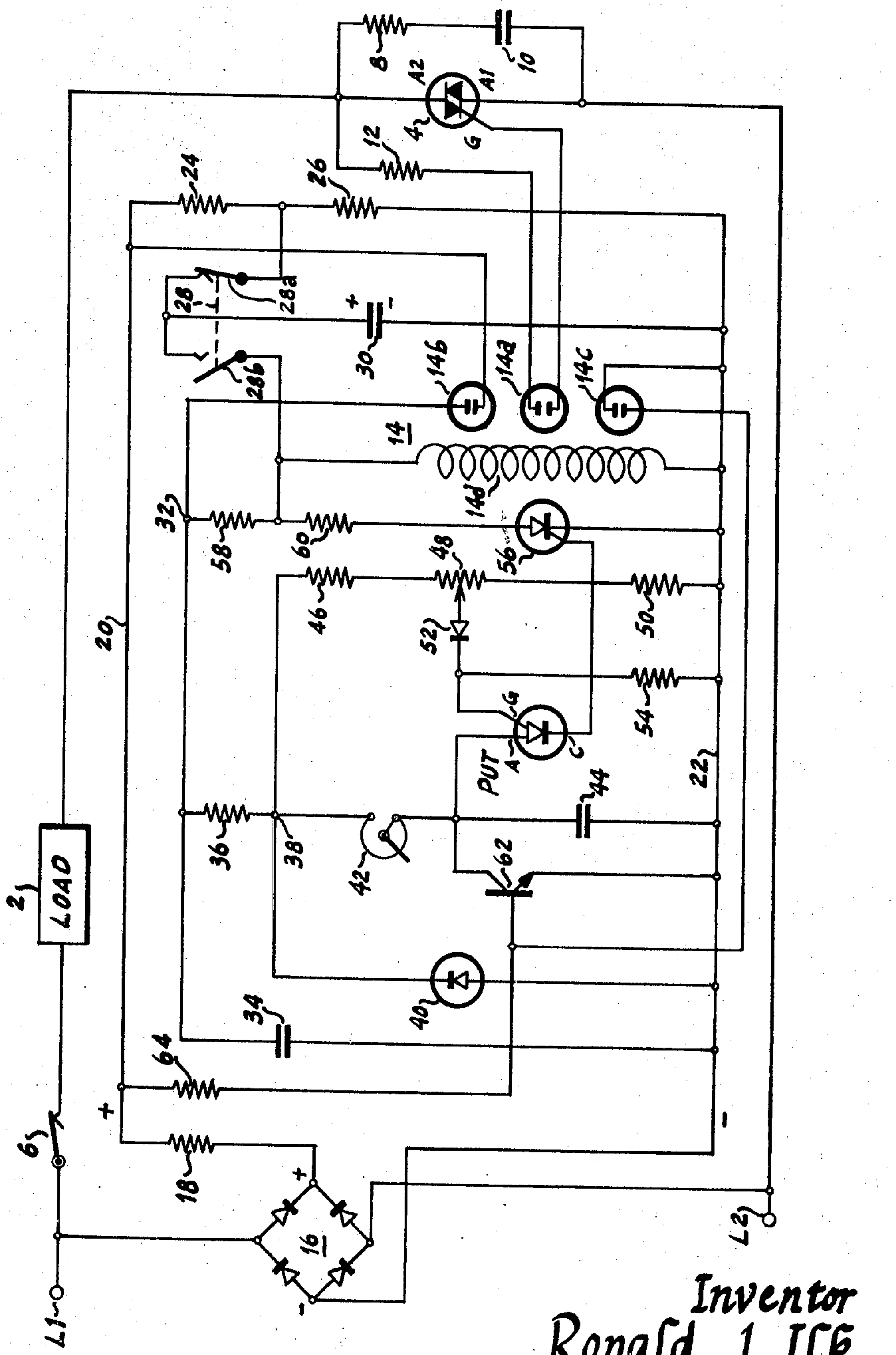
Inventor
Ronald J. Ilk
By [signature]
Attorney

TIMED "ON" CYCLE ELECTRONIC TIMING SYSTEM

BACKGROUND OF THE INVENTION

Electronic timers have been known heretofore for controlling a load through various time intervals. A common type uses an RC network for the time delay circuit. In such network, a current charges a capacitor at a rate determined by a resistor. This resistor is variable so that the time interval can be adjusted. The end of the time interval is determined by a trigger device that usually is a unijunction transistor. This trigger device controls a power switch of the solid-state type.

While these prior electronic timers have been useful for their intended purposes, this invention relates to improvements thereon.

SUMMARY OF THE INVENTION

This invention relates to timed "on" cycle electronic timing systems that have certain advantages over prior timers.

An object of the invention is to provide an improved timing system for timing the energized interval of a load device.

A more specific object of the invention is to provide an improved timed "on" cycle electronic timing system that incorporates a pulse input to insure against false triggering.

Another specific object of the invention is to provide an improved timed "on" cycle electronic timing system that incorporates temperature compensation and good power supply stability characteristics.

Another specific object of the invention is to provide an improved timing system of the aforementioned type that incorporates a reset clamp that insures accurate repeatability of the timing cycle.

A further specific object of the invention is to provide an improved timing system of the aforementioned type that incorporates a momentary input signal and latching of the load "on."

Other objects and advantages of the invention will hereinafter appear.

BRIEF DESCRIPTION OF THE DRAWING

The single figure of the drawing shows a timed "on" cycle electronic timing system constructed in accordance with the invention.

DESCRIPTION OF THE PREFERRED EMBODIMENT

Referring to the drawing, there is shown an alternating current load 2 connected in series with a power-switching device 4 such as a bidirectional thyristor triode or triac and an interlock switch 6 across powerlines L1 and L2 of an AC source.

For dv/dt suppression purposes, a resistor 8 and a capacitor 10 are connected in series across triac 4.

For gating purposes, a resistor 12 and normally open contact 14*a* of a reed relay 14 are connected in series from anode A2 to gate G of the triac. Reed relay 14 is also provided with normally open contacts 14*b* and 14*c* and a coil 14*d* for closing all three contacts. These latter two contacts are for purposes of connecting power to the timer circuit and for controlling a reset transistor, respectively, as hereinafter more fully described.

A rectifier bridge 16 supplies DC power to the system. For this purpose, the input terminals of this rectifier bridge are connected to AC supply lines L1 and L2. The positive output terminal of this rectifier bridge is connected through a resistor 18 to positive supply voltage conductor 20 whereas the negative output terminal of the rectifier bridge is connected to negative supply voltage conductor 22.

The system is provided with means for developing an input voltage pulse in order to provide a momentary input signal to prevent false triggering. This means comprises a voltage divider including resistors 24 and 26 connected in series between DC supply conductors 20 and 22. The junction between these resistors is connected through a normally closed contact 28*a* of an actuating switch 28 and a capacitor 30 to negative DC supply conductor 22.

The system is provided with means for applying the input signal to initiate operation of the system. This means comprises a circuit from the upper, positive side of capacitor 30 through normally open contact 28*b* of actuating switch 28 and coil 14*d* of the reed relay in series to negative DC supply conductor 22. In this circuit, the capacitor is discharged through the coil to close the reed relay contacts as hereinafter more fully described.

The timer circuit is provided with DC supply voltage by contacts 14*b* of the reed relay. These are normally open contacts that, upon closure, connect DC voltage from positive conductor 20 to junction 32. A filter capacitor 34 is connected from junction 32 to negative conductor 22 to provide a smoothed DC supply. This smoothed DC supply is connected from junction 32 through a voltage dropping resistor 36 to a regulated voltage junction 38. For voltage regulation purposes, a zener diode 40 is connected from junction 38 to negative conductor 22.

The timer circuit i connected between voltage regulated junction 38 and negative conductor 22. This timing circuit comprises a bridge circuit having an RC circuit forming first two branches thereof and a voltage divider forming the other two branches thereof. This RC circuit comprises a variable resistor 42 and a timing capacitor 44 connected in series from junction 38 to negative conductor 22. The junction between the variable resistor and timing capacitor is connected to anode A of a programmable unijunction transistor PUT. The aforementioned voltage divider comprises a resistor 46, a potentiometer 48 and a resistor 50 connected in series from junction 38 to negative conductor 22. The slidable tap of potentiometer 48 is connected through a temperature compensating diode 52 in its forward low-impedance direction to gate G of the PUT. The junction between the diode and the PUT gate is connected through a temperature compensating resistor 54 to negative conductor 22. Cathode C of the PUT is connected to the gate of a switching device such as a semiconductor controlled rectifier 56.

In order to deenergize coil 14*d* of the reed relay, it is shunted by a switching device. For this purpose, resistors 58 and 60 and controlled rectifier 56 are connected in series from DC voltage junction 32 to negative conductor 22. The junction between resistors 58 and 60 is connected to the junction between coil 14*d* and contact 28*b* so that resistor 60 and the anode-cathode circuit of the controlled rectifier are connected in series across coil 14*d* of the reed relay.

In order to provide accurate repeatability of the timing function, the timing circuit is provided with resetting or clamping means to clamp the timing capacitor voltage to a predetermined level after each timing function from which it starts charging the next time. This clamping means comprises a transistor 62 of the NPN-conductivity type or the like having its collector-emitter circuit connected across timing capacitor 44. For control purpose, positive voltage conductor 20 is connected through a resistor 64 and normally open contacts 14*c* of the reed relay to negative conductor 22 with the junction between the resistor and contacts being connected to the base of transistor 62.

OPERATION

When AC power is connected to lines L1 and L2, an AC voltage is applied across anodes A1 and A2 of the triac. An AC voltage is also applied to the input terminals of rectifier bridge 16, causing a full-wave rectified current to flow from the positive output terminal of the bridge through resistor 18, conductor 20, resistors 24 and 26 and conductor 22 to the negative output terminal of the rectifier bridge. As a result, a full-wave rectified voltage appears across DC conductors 20 and 22.

To develop an input signal, the voltage drop across resistor 26 causes current to flow through contact 28*a* to charge capacitor 30.

The system is now ready for operation. Momentary operation of actuating switch 28 causes energization of load 2 for a predetermined timed interval. To this end, operation of the actuating switch opens contact 28*a* and closes contact 28*b*. Contact 28*a* interrupts the charging circuit of the capacitor and contact 28*b* discharges the capacitor through coil 14*d* of the reed relay to energize the same and close contacts 14*a–c*. Contact 14*a* allows current to flow into the gate of triac 4 on each half cycle of the AC source voltage to energize the load. Thus, the load will remain energized with AC as long as contact 14*a* of the reed relay remains closed.

At the same time as contact 14*a* caused energization of the load, contacts 14*b* and 14*c* perform their functions. Contact 14*c* removes the voltage clamp from the timing capacitor. For this purpose, control 14*c* connects negative conductor 22 to the base of transistor 62 to render this transistor nonconducting thereby to allow the timing capacitor to charge. Contact 14*b* connects full-wave rectified DC from conductor 20 to junction 32. Filter-capacitor 34 smooths this full-wave rectified DC. This smoothed voltage is applied through resistor 58 to maintain coil 14*d* energized and is applied through resistors 58 and 60 as anode voltage for controlled rectifier 56. The activating switch may now be released to restore to the position shown and to recharge capacitor 30.

This smoothed DC is also applied through resistor 36 to junction 38 wherein it is regulated by zener diode 40 and held not to exceed 20 volts, for example.

This regulated DC voltage is used to operate the timing circuit. To this end, current flows from junction 38 through variable resistor 42 to charge timing capacitor 44. The tap of potentiometer 48 is adjusted so as to apply 10 volts to the gate of the PUT for power supply stability reasons hereinafter described. When the voltage on the timing capacitor reaches 10 volts to bring the anode voltage of the PUT to the same level as its gate, the PUT is rendered conducting to pass a pulse of current into the gate of controlled rectifier 56. At this time, the load has been energized for the required time interval. This pulse of current fires the controlled rectifier into conduction to shunt the coil of the reed relay and to cause it to deenergize. Resistor 60 has a small value such as 10 ohms or the like compared to resistor 58 that has a value of 1 kilohm or the like so that the voltage across resistor 60 is not high enough to keep the coil energized. This deenergization of the reed relay coil causes contacts 14*a–c* to reopen.

Contact 14*a* interrupts the gate circuit of the triac so that the latter restores to its blocking condition at the end of the half cycle when the current goes to or near zero value. The circuit across the triac including resistor 8 and capacitor 10 provides dv/dt protection for the triac. That is, this circuit slows down the rate of change of voltage across the triac and to absorb recovery transients to prevent them from affecting the triac or its proper operation.

Contact 14*b* disconnects DC power from the timing circuit and controlled rectifier 56. This contact also disconnects DC power from the coil of the reed relay.

Contact 14*c* interrupts the shunt from resetting transistor 62. As a result, current flows from conductor 20 through resistor 64 into the base of transistor 62 to render this transistor conducting to discharge the timing capacitor quickly thereby to reset the timing circuit into readiness for another timing operation.

For power supply stability purposes, the voltage at the tap of potentiometer 48 is set at one-half the voltage at junction 38. This ratio of voltages will tend to maintain the timing stable under varying supply voltage. For example, it is apparent that if the voltage at junction 38 goes more positive by a certain amount and the voltage at conductor 22 goes more negative by the same amount due to supply voltage variation, the voltage at the gate of the PUT will remain constant since it is at the midpoint. Zener diode 40 keeps any such variation to a minimum.

For temperature compensation purposes, diode 52 and resistor 54 are connected in series from the tap of potentiometer 48 to negative conductor 22. Resistor 54 allows a small current to flow through diode 52. This diode has a variation in response to temperature change that offsets the variation of the PUT in response to such temperature change. Thus, any variation in the anode voltage characteristic of the PUT as a result of temperature change will be compensated by an equivalent variation in the gate voltage due to the diode and resistor.

The pulse input brought about by charging capacitor 30 and then discharging it to energize the reed relay coil insures against false triggering. The first time the actuating switch is operated, this capacitor discharge energizes the reed relay which latches the load in its energized condition at contact 14*a* and maintains its own coil energized at contact 14*b*. Therefore, any holding of the activating switch closed or reoperating the same or "teasing" of its contacts cannot affect the timing operation.

While a single-pole double-throw switch and a resistor-capacitor circuit has been shown for the input means, it will be apparent that other means could be provided in place thereof. For example, a single-pole single-throw switch could be connected across contact 14*b* of the reed relay. Alternatively, transistor circuits responsive to a pulse could be used in place of such single-pole single-throw switch.

While the system hereinbefore described is effectively adapted to fulfill the objects stated, it is to be understood that the invention is not intended to be confined to the particular preferred embodiment of timed "on" cycle electronic timing system disclosed, inasmuch as it is susceptible of various modifications without unduly departing from the scope of the appended claims.

I claim:

1. In a timed "on" cycle electronic timing system, the combination comprising:

an electrical power supply source;

a load device adapted to be energized from said source;

power switching means connected in circuit with said source and load device and comprising a semiconductor circuit for controlling energization and deenergization of the load device;

a starting control means;

a solid-state timing circuit;

a resetting circuit for resetting said timing circuit after each timing function to insure accurate repeatability;

means supplied from said source for providing a control voltage supply;

input means responsive to momentary operation of said starting control means for providing an input pulse;

control means operable by said input pulse comprising:

first means for operating said semiconductor circuit to energize the load device;

second means for latching said control means in its operated condition and for initiating operation of said timing means at the same time as the load device is energized; and third means for rendering said resetting means ineffective at the same time as said load device is energized to allow said timing circuit to operate; and said timing circuit comprising means operable at the end of its time interval for restoring said control means thereby to cause deenergization of the load device and unlatching of said control means.

2. In a timed "on" cycle electronic timing system, the combination comprising:

an electrical power supply source;

a load device adapted to be energized from said source;

power switching means connected in circuit with said source and load device and comprising a semiconductor circuit for controlling energization and deenergization of the load device;

a starting control means;

a solid-state timing circuit;

means supplied from said source for providing a control voltage supply;

input means responsive to momentary operation of said starting control means for providing an input pulse;

control means operable by said input pulse comprising:

first means for operating said semiconductor circuit to energize the load device; and second means for latching said control means in its operated condition and for initiating operation of said timing means at the same time as the load device is energized;

said timing circuit comprising means operable at the end of its time interval for restoring said control means thereby to cause deenergization of the load device and unlatching of said control means;

said starting control means comprising an actuating switch having a normally closed contact and a normally open contact operable in unison; and said input means comprising a resistance-capacitor circuit closed by said normally closed contact to charge said capacitor and closure of said normally open contact causing discharge of said capacitor to provide said input pulse.

3. In a timed "on" cycle, electronic timing system, the combination comprising:

an AC power source;

a load device adapted to be energized from said source;

power switching means connected in circuit with said source and load device and comprising a semiconductor element for controlling energization and deenergization of the load device;

rectifier means supplied from said source for providing a DC control voltage supply;

a solid-state timing circuit adapted to be energized from said control voltage supply;

an actuating switch;

input means responsive to momentary operation of said actuating switch for providing an input pulse;

a resetting circuit for resetting said timing circuit after each timing function;

control means operable by said input pulse comprising:

first means for operating said semiconductor element to energize the load device;

second means for completing a self-maintaining circuit for said control means to keep it operated and for initiating operation of said timing circuit at the same time as the load device is energized; and third means for rendering said resetting circuit ineffective at the same time as the load device is energized to allow said timing circuit to operate; and said timing circuit comprising means operable at the end of its time interval for restoring said control means thereby to cause said first means to effect restoration of said semiconductor element and deenergization of the load device, to cause said second means to interrupt said self-maintaining circuit, and to cause said third means to render said resetting means operable to reset said timing circuit into readiness for another timing function.

4. The invention defined in claim 3, wherein said timing circuit comprises:

a programmable unijunction transistor;

an RC time delay circuit including a resistor and a capacitor for applying an increasing voltage to the anode of said programmable unijunction transistor; and a voltage divider for applying an adjustable voltage to the gate of said programmable unijunction transistor having a value substantially one-half the voltage that is applied across said RC circuit and said voltage divider.

5. The invention defined in claim 4 wherein said timing circuit also comprises:

means for regulating the voltage that is applied across said RC circuit and said voltage divider.

6. The invention defined in claim 4, wherein said timing circuit also comprises:

a diode in the gate circuit of said programmable unijunction transistor; and a resistor forming a current path from said voltage divider through said diode and said resistor to one side of said control voltage supply to afford current flow through said diode; and said diode having a temperature variation characteristic that substantially offsets the variation of the programmable unijunction transistor in response to temperature change therein.

7. The invention defined in claim 4, wherein said resetting circuit comprises:

a semiconductor device adapted to shunt said timing capacitor to discharge the latter; and turn-on means supplied from said control voltage supply for rendering said semiconductor device conducting; and said third means comprises switching means for shunting said turn-on means to allow charging of said timing capacitor.

8. The invention defined in claim 3, wherein:

said semiconductor element comprises a bidirectional thyristor triode;

said control means comprises a reed relay having an energizing coil and contacts; and said first means comprises one of the contacts of said reed relay that closes when said input pulse energizes said coil thereby complete a firing circuit to the gate of said thyristor.

* * * * *